US011170060B2

(12) United States Patent
Jang et al.

(10) Patent No.: US 11,170,060 B2
(45) Date of Patent: Nov. 9, 2021

(54) MOBILE TERMINAL AND CONTROL METHOD THEREOF

(71) Applicant: LG ELECTRONICS INC., Seoul (KR)

(72) Inventors: Hyukjae Jang, Seoul (KR); Keumsung Hwang, Seoul (KR); Jieun Kim, Seoul (KR); Minho Lee, Seoul (KR); Minhwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 565 days.

(21) Appl. No.: 15/753,533

(22) PCT Filed: Aug. 18, 2015

(86) PCT No.: PCT/KR2015/008587
§ 371 (c)(1),
(2) Date: Feb. 19, 2018

(87) PCT Pub. No.: WO2017/030211
PCT Pub. Date: Feb. 23, 2017

(65) Prior Publication Data
US 2019/0018898 A1   Jan. 17, 2019

(51) Int. Cl.
*G06F 16/00* (2019.01)
*G06F 16/9535* (2019.01)
(Continued)

(52) U.S. Cl.
CPC .......... *G06F 16/9535* (2019.01); *G06F 3/167* (2013.01); *G06F 16/9038* (2019.01);
(Continued)

(58) Field of Classification Search
CPC ............. G06F 16/9535; G06F 16/9038; G06F 16/954; G06F 3/167; H04M 1/72522; H04M 2250/74
See application file for complete search history.

(56) References Cited

U.S. PATENT DOCUMENTS 8,326,836 B1    12/2012  Pike et al.
2011/0307516 A1*  12/2011  Cho .................... G06F 16/447
                                                 707/774
(Continued)

FOREIGN PATENT DOCUMENTS

KR        1020070095671      10/2007
KR           100893129        4/2009
(Continued)

OTHER PUBLICATIONS

PCT International Application No. PCT/KR2015/008587, International Search Report dated May 18, 2016, 2 pages.

*Primary Examiner* — Ashish Thomas
*Assistant Examiner* — Suman Rajaputra
(74) *Attorney, Agent, or Firm* — Lee, Hong, Degerman, Kang & Waimey PC

(57) ABSTRACT

The present invention relates to a mobile terminal capable of voice recognition and a control method thereof. A mobile terminal, according to the present invention, comprises: a user input unit for receiving an input of a search word from a user; a control unit for calculating at least one search result corresponding to a time lapse on the basis of history information related to the search word; and a display unit for outputting the calculated at least one search result corresponding to a time lapse.

14 Claims, 13 Drawing Sheets

(51) Int. Cl.
   *G06F 16/954*     (2019.01)
   *H04M 1/72403*    (2021.01)
   *G06F 16/9038*    (2019.01)
   *G06F 3/16*       (2006.01)

(52) U.S. Cl.
   CPC ...... *G06F 16/954* (2019.01); *H04M 1/72403*
              (2021.01); *H04M 2250/74* (2013.01)

(56) References Cited

U.S. PATENT DOCUMENTS

| | | | | |
|---|---|---|---|---|
| 2013/0080469 | A1* | 3/2013 | Choi | G06F 3/0485 |
| | | | | 707/772 |
| 2016/0364502 | A1* | 12/2016 | Wu | G06F 16/9535 |
| 2017/0228700 | A1* | 8/2017 | Kim | G06N 5/04 |
| 2019/0028418 | A1* | 1/2019 | Ban | H04M 1/72552 |

FOREIGN PATENT DOCUMENTS

| | | |
|---|---|---|
| KR | 1020140118215 | 10/2014 |
| KR | 1020150045404 | 4/2015 |

* cited by examiner

MOBILE TERMINAL AND CONTROL METHOD THEREOF

CROSS-REFERENCE TO RELATED APPLICATIONS

This application is the National Stage filing under 35 U.S.C. 371 of International Application No. PCT/KR2015/008587, filed on Aug. 18, 2015, the contents of which are all hereby incorporated by reference herein in its entirety.

TECHNICAL FIELD

The present disclosure relates to a mobile terminal available for speech recognition and a control method thereof.

BACKGROUND ART

A terminal may be divided into a mobile terminal (mobile/portable terminal) and a stationary terminal according to whether the terminal may be moved. The mobile terminal may be divided into a handheld terminal and a vehicle mounted terminal according to whether the user may carry the mobile phone directly.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal may support more complicated functions such as capturing images or video, reproducing music or video files, playing games, receiving broadcast signals, and the like. By comprehensively and collectively implementing such functions, the mobile terminal may be embodied in the form of a multimedia player or a device.

In addition, a user may input a voice search word to a terminal and check a desired search result. However, there is a limitation in that search results are provided in consideration of only a current state of the terminal (a current state of the user).

In order to support and enhance the functionality of the terminal, it may be considered to improve the structural and/or software parts of the terminal.

DISCLOSURE

Technical Problem

The present invention is directed to solving the above-mentioned problems and other problems. Another aspect of the present invention is to provide a mobile terminal which receives a search word by a voice and a touch input, recognizes a user invention from history information, and provides a search result based on the user intention, and a control method thereof.

Technical Solution

According to an aspect of the present disclosure, a mobile terminal includes: a user input unit receiving a search word from a user; a controller calculating at least one search result corresponding to the passage of time on the basis of history information related to the search word; and a display unit outputting the at least one search result corresponding to the passage of time.

In an embodiment, the user input unit may receive the search word from the user by voice.

In another embodiment, the controller may calculate the at least one search result corresponding to a time at which the search word is input and a time thereafter on the basis of the history information related to the search word.

In another embodiment, the controller may set priority of the at least one search result on the basis of the history information related to the search result, and output the at least one search result according to the priority.

In another embodiment, when a preset user input is applied, the controller may set a degree to which the at least one search result is output.

In another embodiment, the controller may output a time line on the basis of a degree of a drag input applied by the user, and output a search result corresponding to the passage of time near the time line.

In another embodiment, when a search result corresponding to a specific time is in plurality, the controller may output at least one of the plurality of search results corresponding to the specific time on the basis of a preset user input.

In another embodiment, after a user input for selecting some of at least one search result is applied, when a user input for inputting a search word is applied again, the controller may calculate a search result corresponding to the search word input again on the basis of the selected search result.

In another embodiment, the controller may calculate a plurality of search results corresponding to the input search word on the basis of history information related to the search word, and output a screen for selecting at least one of the plurality of calculated search results.

In another embodiment, when a user input selecting a least one of the plurality of calculated search results is applied, the controller may execute a control command corresponding to the selected search result.

According to another aspect of the present disclosure, a method for controlling a mobile terminal includes: (a) receiving a search word from a user; (b) calculating at least one search result corresponding to the passage of time on the basis of history information related to the search word; and (c) outputting the at least one calculated search result in accordance with the passage of time.

In an embodiment, (a) may include: receiving the search word from the user by voice.

In another embodiment, (b) may include: calculating the at least one search result corresponding to a time at which the search word is input and a time thereafter on the basis of the history information related to the search word.

In another embodiment, (c) may include: setting priority of the at least one search result on the basis of the history information related to the search result, and outputting the at least one search result according to the priority.

In another embodiment, (c) may include: when a preset user input is applied, setting a degree to which the at least one search result is output.

In another embodiment, (c) may include: outputting a time line on the basis of a degree of a drag input applied by the user and outputting a search result corresponding to the passage of time near the time line.

In another embodiment, (c) may include: when a search result corresponding to a specific time is in plurality, outputting at least one of the plurality of search results corresponding to the specific time on the basis of a preset user input.

In another embodiment, (c) may include: after a user input for selecting some of at least one search result is applied, when a user input for inputting a search word is applied again, calculating a search result corresponding to the search word input again on the basis of the selected search result.

In another embodiment, (c) may include: calculating a plurality of search results corresponding to the input search word on the basis of history information related to the search word and outputting a screen for selecting at least one of the plurality of calculated search results.

In another embodiment, (c) may include: when a user input selecting a least one of the plurality of calculated search results is applied, executing a control command corresponding to the selected search result.

Advantageous Effects

Effects of the mobile terminal and the control method thereof according to the present invention are as follows.

According to at least one of the embodiments of the present invention, an intention of the user who inputs a search word may be extracted based on history information related to a search word, e.g., a current location of the terminal or a usual location of the terminal, a schedule of the user stored in a schedule application, a received message or call, an SNS message, an e-mail, a record of goods purchase, a record of searching a website, a search word input in a website, memo record contents, a user state, a usage pattern, and the like.

Accordingly, it is possible to provide a user context-based IA recommendation in consideration of information of a future state of the user, as well as a current state of the user.

In addition, according to at least one of the embodiments of the present invention, convenient searching may be provided through a multimodal interface using a combination of voice and touch.

According to another embodiment of the present invention, information may be easily and intuitively provided by expressing a search result in a time line and a space line.

According to another embodiment of the present invention, since a plurality of search results are recommended, user inconvenience of the related art in which only one search result is output, so if the search result is wrong, a search word must be input again may be solved.

According to another embodiment of the present invention, it is possible to perform searching step-by-step based on a search result calculated by inputting an additional search word.

As a result, user convenience may be improved.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BEST MODES

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
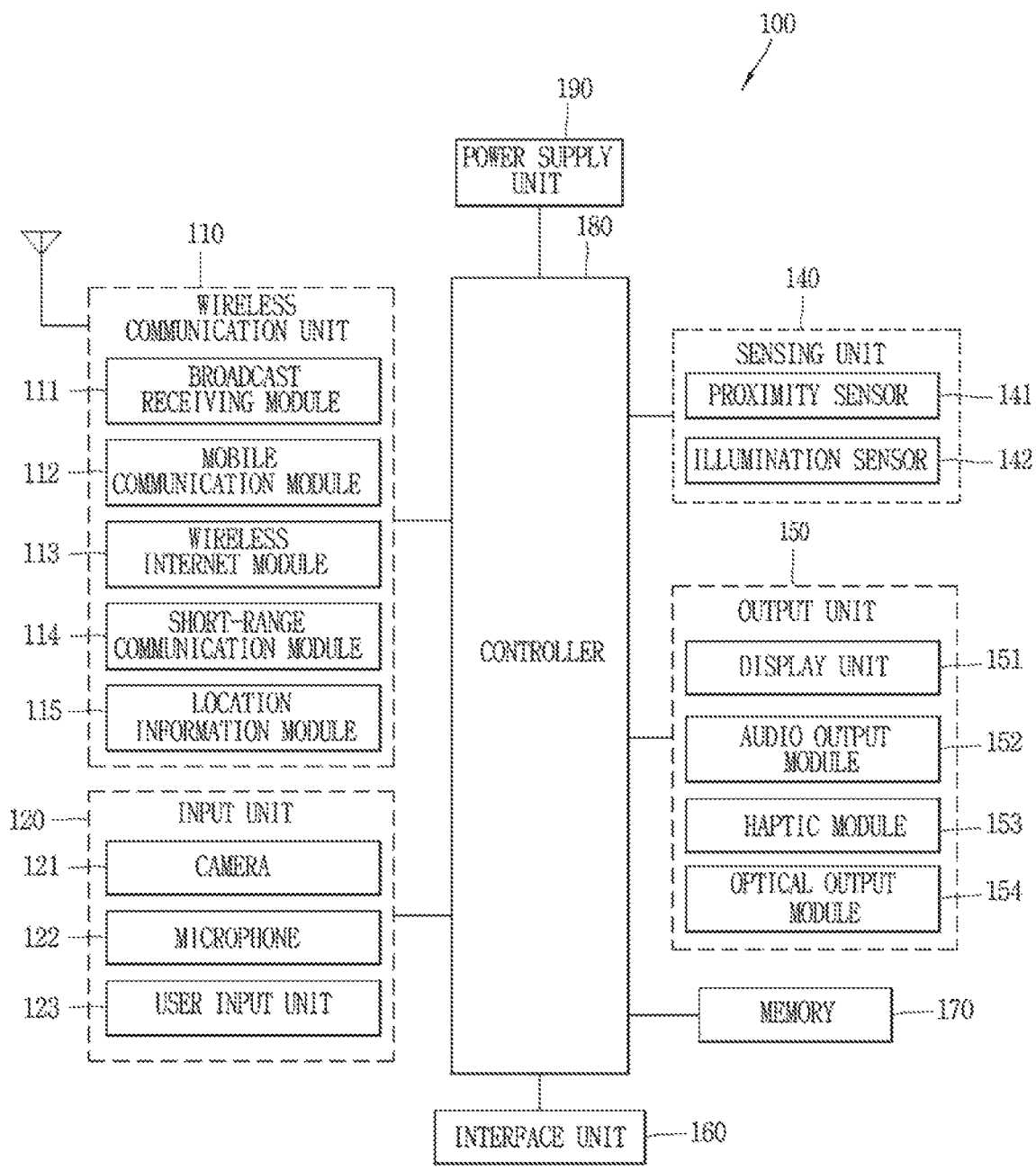
FIG. 1A is a block diagram illustrating a mobile terminal related to the present disclosure.
Figure 1B:
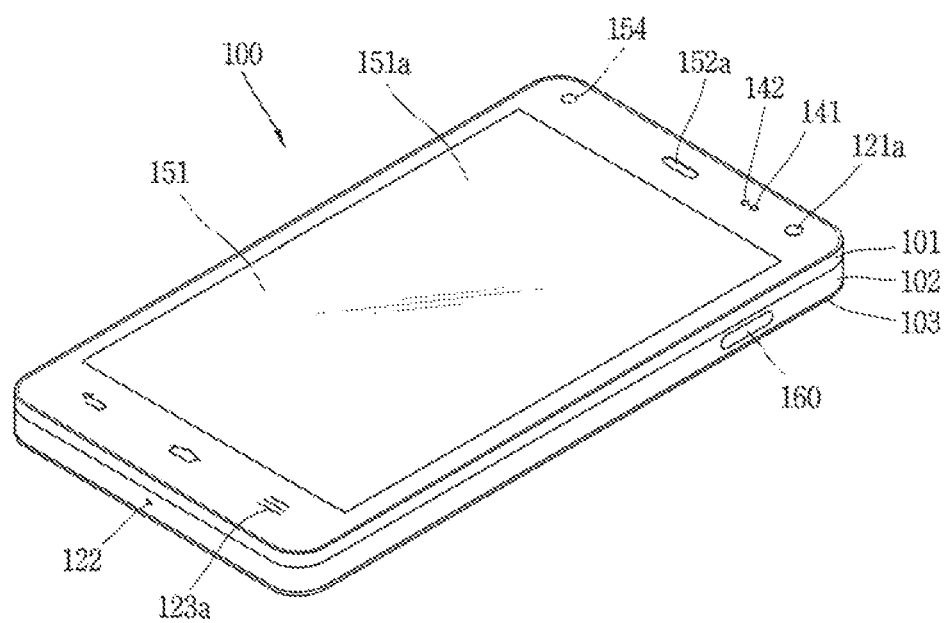
FIGS. 1B and 1C are conceptual diagrams illustrating an example of a mobile terminal according to the present invention viewed in different directions.
Figure 1C:
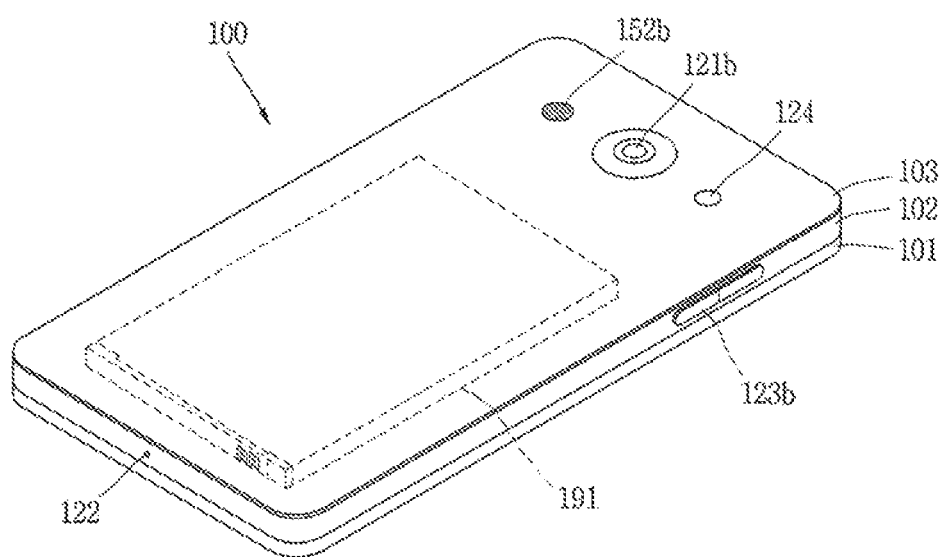

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor provided at the display unit 151 may be configured to sense taps in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense a tap applied thereon, with a different activation period, according to an activated state or a deactivated state of the display unit 151.

For instance, in a deactivated state of the display unit 151, the touch sensor may be activated with a preset period. In this case, the preset period may be a time period more than 0. On the other hand, in an activated state of the display unit 151, the touch sensor may be always operated in an activated state. In this case, an activation period of the touch sensor may be a time period of 0 or very close to 0.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. On the other hand, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for input of taps onto the display unit 151, while maintaining an activated state. On the other hand, if the display unit 151 is in a deactivated state (hereinafter, will be referred to as a doze mode), the touch sensor may be activated at preset periods.

When the preset activation period of the touch sensor is shorter, a sensing speed with respect to taps applied onto the display unit 151 is higher. However, in this case, a power consumption amount of the touch sensor may be increased. On the other hand, when the preset activation period of the touch sensor is longer, a sensing speed with respect to taps applied onto the display unit 151 may be lower, while a power consumption amount of the touch sensor is decreased.

Thus, the preset period may be set so that a sensing speed with respect to taps applied onto the display unit 151 can be high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a deactivated state and the touch sensor is periodically activated, if a preset touch input (first and second touch inputs consecutively applied onto a predetermined region within a reference time, e.g., a TOCK-TOCK' touch input) is sensed by the touch sensor, the controller 180 may convert the doze mode into an activate mode where the display unit and the touch sensor are activated.

Moreover, the touch sensor may be driven at a different period according to a state of the display unit 151. For instance, the touch sensor may execute a doze mode when the display unit 151 is in a closed state, and execute an active mode when the display unit 151 is converted from a closed state to an open state.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, exemplary embodiments related to a control method that may be implemented in the mobile terminal configured as described above will be described with reference to the accompanying drawings. It will be apparent to those skilled in the art that modifications and variations can be made without departing from the spirit and scope of the invention.

Figure 2:
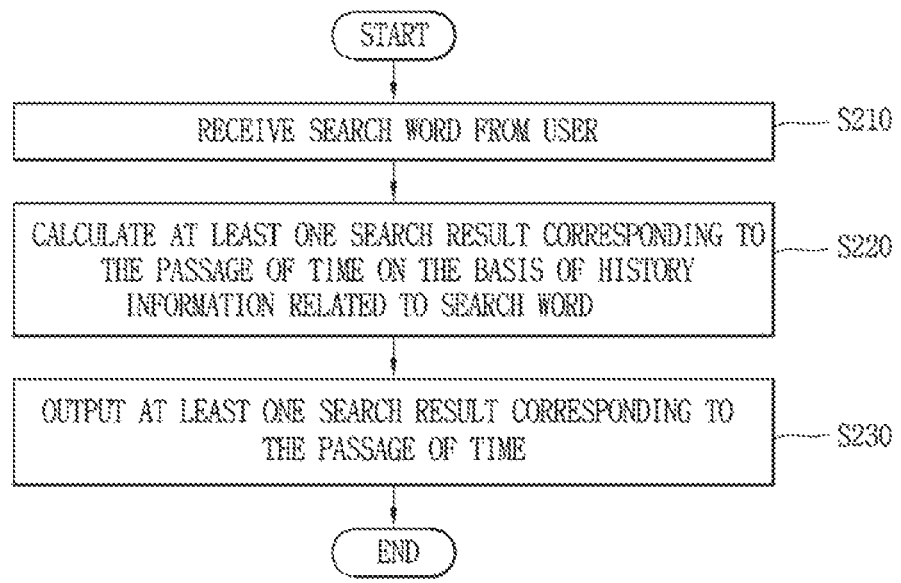
FIG. 2 is a flowchart illustrating a method of controlling a mobile terminal according to the present invention.

FIG. 2 is a flowchart illustrating a method of controlling a mobile terminal according to the present invention.

Referring to FIG. 2, a search word is received from a user (S210).

The search word refers to information input by the user to be provided with desired information. In an embodiment, the user may input the search word by text or voice. Also, when inputting voice, a touch input may also be used together.

Next, at least one search result corresponding to the passage of time (or a time lapse) is calculated based on history information related to the search word (S220).

The history information related to a search word refers to information necessary for deriving a search result corresponding to the search word. For example, the history information related to the search word may include a current location of the terminal 100, a schedule of the user stored in a predetermined application, a received message or call, an SNS message, an e-mail, goods purchase record, a website search record, a search word input in a website, memory record contents, and the like. Also, the history information may include a usage pattern, a predetermined pattern, etc. of the user derived therefrom.

A search result of a search word (a search result corresponding to a search word) may be calculated to correspond to the passage of time. In an embodiment, when the user inputs a voice search word "Please search for the theater of movie A", a first adjacent movie theater may be searched based on the current location of the terminal 100. In addition, a second movie theater may be searched based on history information that the user gets off word at 6:00 p.m. passes by the second movie theater to get back home.

As a result, the first movie theater corresponding to the current location and current time of the terminal 100 and the second movie theater corresponding to the location after 6 o'clock may be output as a search result. That is, the search result in consideration of not only the current status information of the user (current location, etc.) but also the future status information (location after 6 o'clock, etc.) may be derived.

Next, the calculated at least one search result is output to correspond to the passage of time (S230).

In an embodiment, a time line may be output and a search result may be output to correspond to time of the time line. Specifically, the first movie theater may be output at the current time of the time line and the second movie theater may be output at 6 o'clock.

Hereinafter, specific embodiments will be described.

In an embodiment, step S210 may include receiving the search word from the user by voice.

In another embodiment, step S220 may include calculating the at least one search result corresponding to each of a time at which the search word is input and a time thereafter, based on history information related to the search word.

In another embodiment, step S230 may include setting priority to the at least one search result based on history information related to the search word, and outputting the at least one search result according to the priority.

In another embodiment, step S230 may include setting a degree to which the at least one search result is output based on a predetermined user input.

In another embodiment, step S230 may include outputting a time line based on a degree of a drag input applied by the user and outputting a search result corresponding to the passage of time close to the time line.

In another embodiment, when a search result corresponding to a specific time is in plurality, at least one of the plurality of search results is output to correspond to the specific time based on a preset user input in step S230.

In another embodiment, in step S230, after a user input for selecting some of the at least one search result is applied, when a user input for inputting the search word again is applied, a search result corresponding to the search word input again may be calculated based on the selected search result.

In another embodiment, step S230 may include calculating a plurality of search results corresponding to the input search word based on the history information related to the search word, and outputting a screen for selecting at least one of the plurality of calculated search results.

In another embodiment, step S230 may include executing a control command corresponding to the selected search result based on a user input applied to select at least one of the plurality of calculated search results.

As described above, the user input unit 123 may receive a search word from the user. Accordingly, the controller 180 may calculate at least one search result corresponding to the passage of time based on the history information related to the search word. Also, the display unit 151 may output the at least one calculated search result in accordance with the passage of time.

In another embodiment, the user input unit 123 may receive the search word from the user by voice.

In another embodiment, the controller 180 may calculate the at least one search result corresponding to a time at which the search word is input and a time thereafter, respectively, based on the history information related to the search word.

Also, the controller 180 may set priority to the at least one search result based on the history information related to the search word, and output the at least one search result according to the priority.

Figure 3:
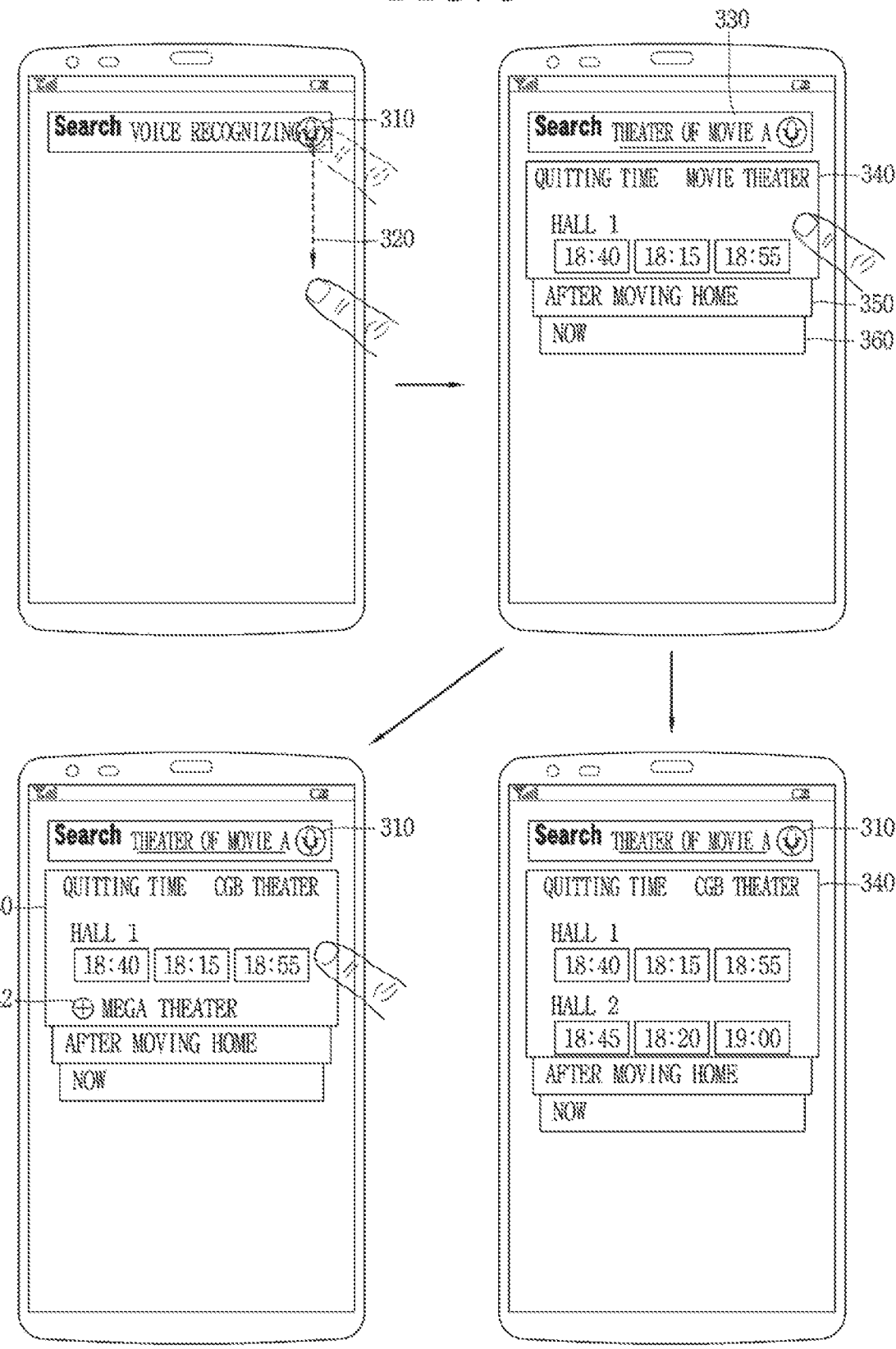
FIG. 3 is a conceptual diagram illustrating an embodiment in which a search result is output according to priority.

FIG. 3 is a conceptual diagram illustrating an embodiment in which a search result is output according to priority.

Referring to FIG. 3, the user may execute a speech recognition application to input a search word. Thereafter, a voice search word may be input together with a preset touch input.

In an embodiment, the user may touch a microphone icon 310 and subsequently apply a drag input 320 downwards, during which the user may input "theater of movie A" by voice.

As a result, the recognized voice "theater of movie A" may be output on a search word output field 330. In addition, pieces of theater information 340, 350, and 360 of the movie A, which is calculated based on the history information of the user, may be output according to priority.

In an embodiment, the following history information may be used.

Depending on a location of the terminal 100 or a user's schedule, a current time of 3:00 p.m. may be detected as a working time, 6:00 p.m. may be detected as a leaving time, and 7:00 p.m. may be detected as a time of arrival at home.

In case where the current location of the terminal 100 is a specific location rather than the vicinity of a company and the location of the terminal 100 is periodically detected as the specific location during business hours, the specific location may be detected as a place which the user visits on business. Here, information on the specific location may be received from the user. That is, the user may set the specific location as the place which the user visits on business.

Also, is also possible to detect a record that the user has watched a movie often near the company after work and a record that the user has occasionally watched movie near his place.

Based on such history information, it is extracted that the intention of the user who inputs "theater of movie A" by voice is for searching the theater of the movie A after work. As a result, it is possible to preferentially output information 340 of the theater of movie A near the company after work may be preferentially output. In an embodiment, in the information 340 of the theater of movie A, a show time of the movie A corresponding to a time after work may be output.

Specifically, the information 340 of the theater of movie A near the company after work having the highest priority may be output to the point where the drag input 320 is applied. In addition, information 350 of the theater of movie A near the house having the next highest priority may be output in a next layer. Similarly, information 360 of the theater of movie A near the place which the user visits on business during business hours having a lowest priority may be output as a lowest layer. Here, only a time or place may be simply displayed in the lower layer.

Then, when the finger applying the drag input 320 is released from the screen 151, more specific information about the theater of movie A near the company may be output. For example, a show time of the theater of movie A, a route to the theater of movie A, and a time to be taken for the user to reach the theater may be displayed.

In another embodiment, when the touch of the finger applying the drag input 320 is held for a predetermined time or a tapping input is applied, information 342 about another theater near the company may be output.

Specifically, the other theater may be a theater in which the movie A is shown, which is further away from the company. That is, the theater located near the company and having a lower priority may be output.

Figure 4:
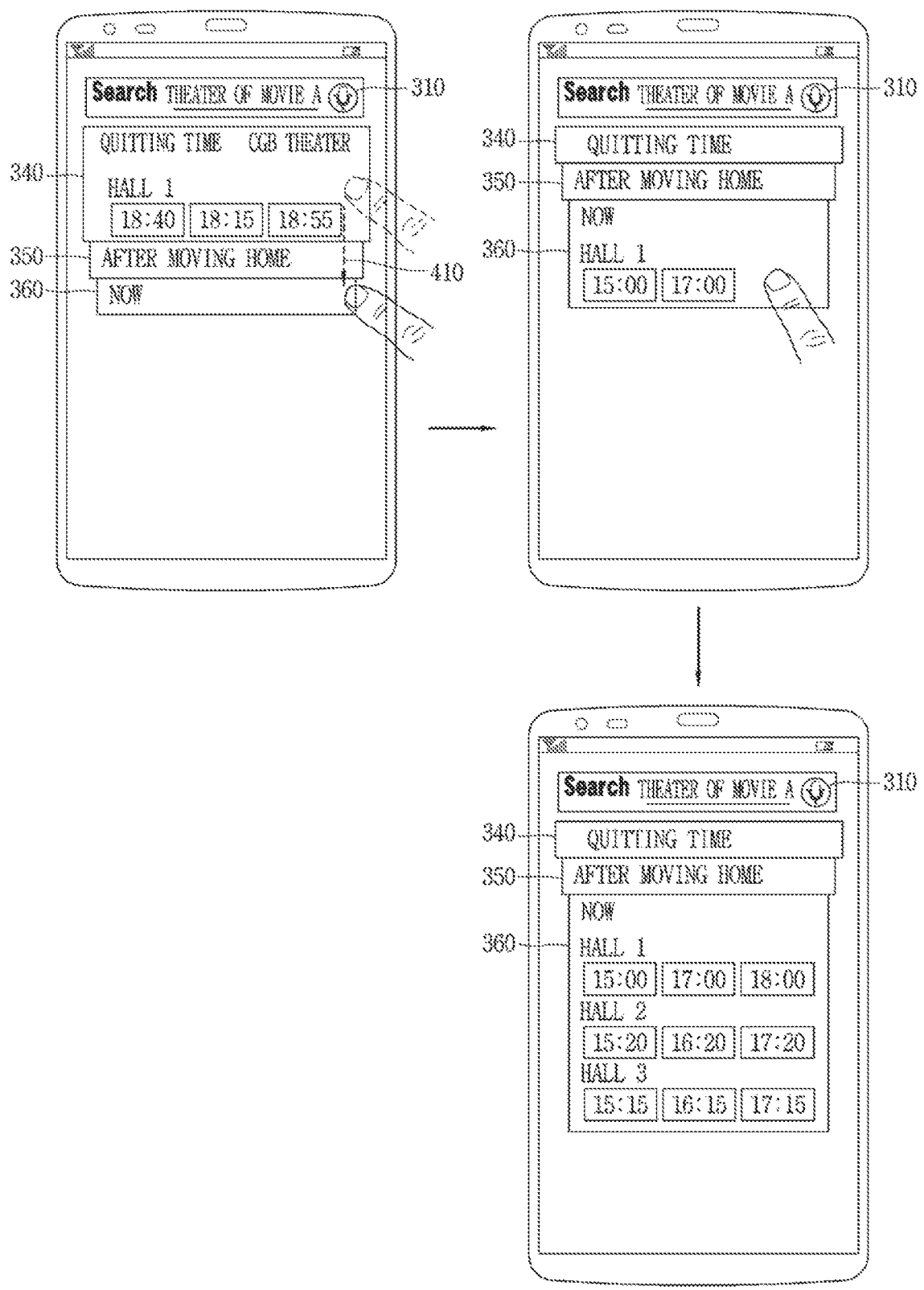
FIG. 4 is a conceptual diagram illustrating an embodiment in which the contents of a search result according to priority is checked.

FIG. 4 is a conceptual diagram illustrating an embodiment in which the contents of a search result according to priority is checked.

Referring to FIG. 4, in a state in which screening information 340, 350, 360 of the theater of movie A is output according to priority at a point where the drag input 320 is applied, a user input for selecting one of lower priority times may be applied. In an embodiment, the user may apply a drag input 410 to a lowest layer, without releasing the finger touching the screen from the screen 151. Accordingly, information 360 of the theater of movie A near the place which the user visits on business may be output in a preview manner. In an embodiment, a show time of the movie A corresponding to a time (3:00 p.m.) after the current time may be output on the information 360 of the theater of movie A.

In another embodiment, after a predetermined time has elapsed since the drag input 410 was applied to the lowest layer, the information 360 of the theater of movie A near the place which the user visits on business may be output in a preview manner.

Thereafter, when the finger applying the drag input 410 is released from the screen 151, more specific information about the theater of movie A near the place which the user visits on business may be output.

Meanwhile, when a preset user input is applied, the controller 180 may set a degree to which the at least one search result is output.

Specifically, the controller 180 may output a time line based on a degree of a drag input applied by the user and output a search result corresponding to the passage of time in proximity to the time line.

Here, when a plurality of search results correspond to a specific time are, the controller 180 may output at least one of the plurality of search results corresponding to the specific time based on a preset user input.

Figure 5:
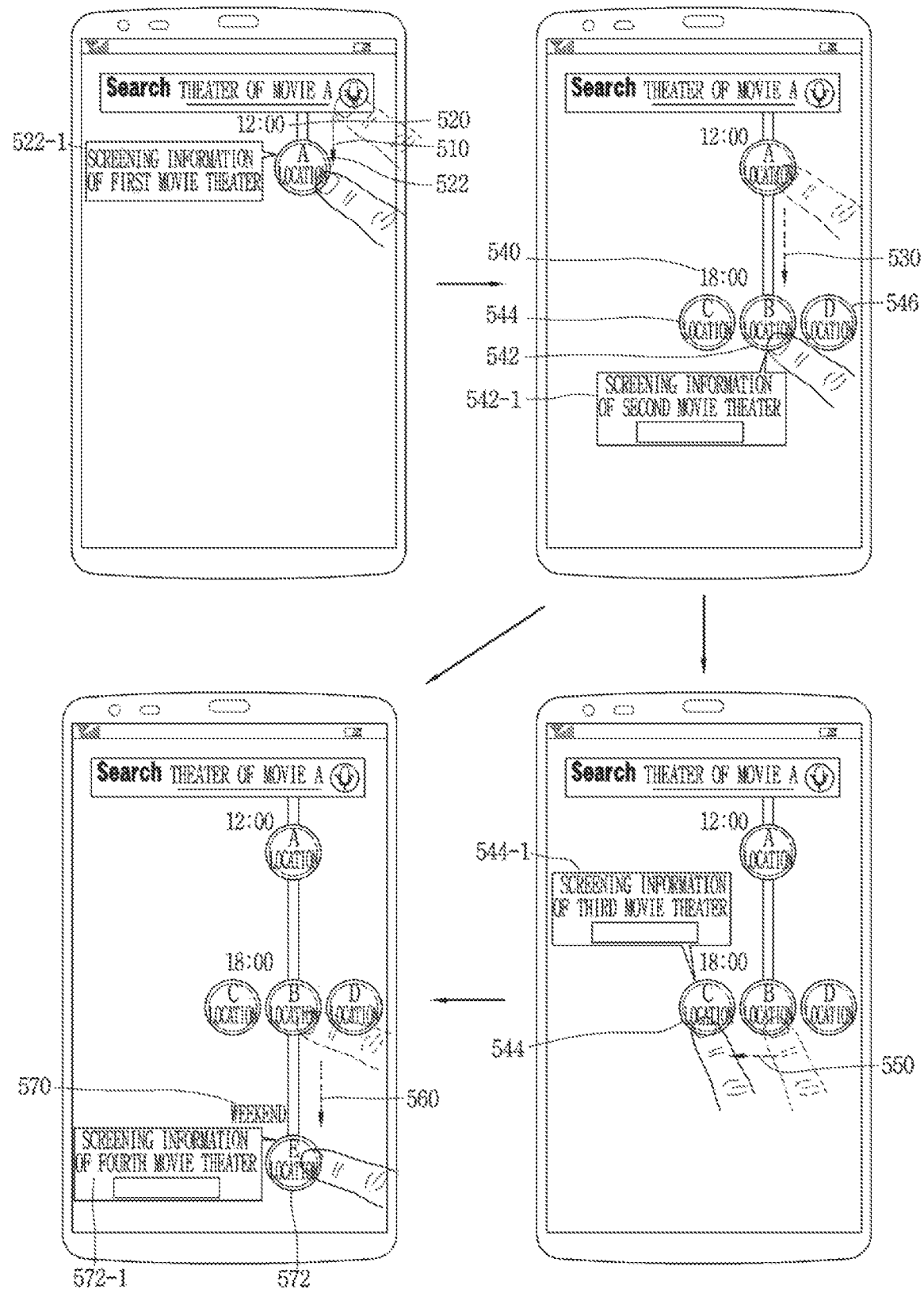
FIG. 5 is a conceptual diagram illustrating an embodiment in which a search result is output to a time line.

FIG. 5 is a conceptual diagram illustrating an embodiment in which search results are output to a time line.

Referring to FIG. 5, the user may execute a speech recognition application to input a search word. Thereafter, a voice search word may be input together with a preset touch input.

In an embodiment, the user may touch a microphone icon and subsequently apply a drag input 510 downwards, during which the user may input "movie theater" by voice.

As a result, the recognized voice "movie theater" may be output in a search word output field. Further, a search result calculated based on the user's history information may be output to the time line.

In an embodiment, the following history information may be used.

Depending on the usual location of the terminal 100 or a schedule of the user, a current time, 12 o'clock, may be detected as business hours and the 6 o'clock p.m. may be detected as quitting time (or closing time). In addition, a schedule for meeting a friend at location E on the weekend may be detected.

Based on the history information, the time line is stretched out according to the drag input 510 of the user, and the current time 520, the icon 522 corresponding to the current location, and movie theater information 522-1 closest to the current location may be output. At this time, when a touch input is applied to the movie theater information 522-1 closest to the current location, detailed information related thereto is further output.

Thereafter, when a drag input 530 is applied, the time line is subsequently stretched out and the quitting time 540, 6:00 p.m., and icons 542, 544, and 546 corresponding to locations by which the user passes after the quitting time may be output.

In detail, an icon 542 corresponding to the location of the company and movie theater information 542-1 near the company may be output.

In another embodiment, when a drag input is applied in a direction opposite to the drag input 530, the current state may be returned to the previous state. That is, only the current time 520, the icon 522 corresponding to the current location, and the movie theater information 522-1 closest to the current location may be output.

In another embodiment, the user may apply a drag input 550 to an icon 544 corresponding to another location present in a route from the company to the home. Accordingly, information 544-1 of a movie theater in the vicinity of the location may be output. That is, the user may receive recommendation of information regarding a movie theater which the user may go to after work by horizontally applying a drag input (or flicking input) input.

Here, depending on a distance from the company, information regarding a close location may be output with priority. In detail, information 542-1 regarding a movie theater near the company may first be output and information 544-1 regarding a movie theater at a location between the company and the house may be output according to a user selection.

In another embodiment, when a drag input 560 is applied downwards, the time line is subsequently stretched out and a weekend 570, a next day, and an icon 572 corresponding to an appointed place on the weekend may be output. Also, movie theater information 572-1 near the appointed place may be output.

Figure 6:
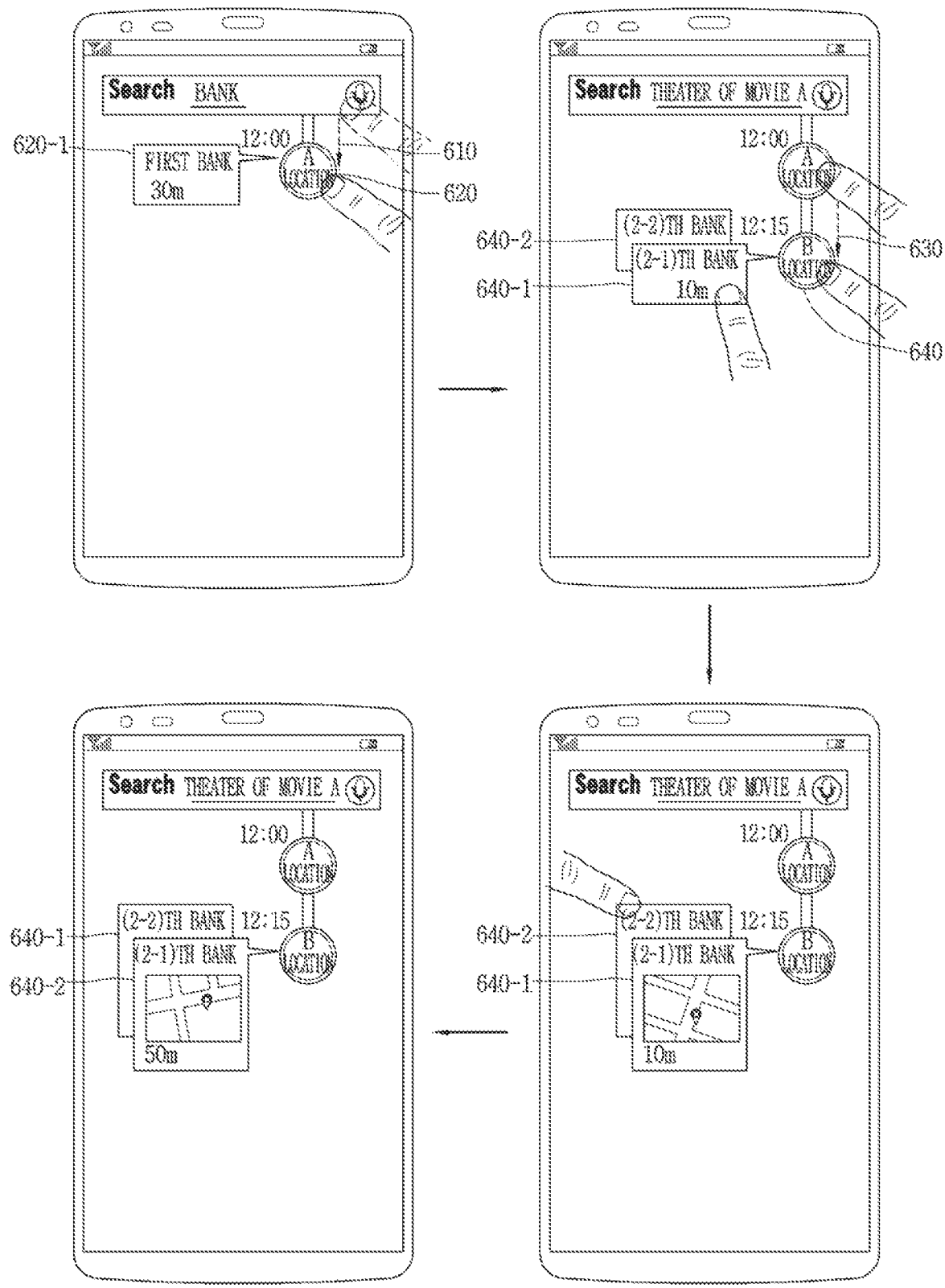
FIG. 6 is a conceptual diagram illustrating an embodiment in which the contents of a search result output to the time line is checked.

FIG. 6 is a conceptual diagram illustrating an embodiment in which the contents of a search result output to the time line is checked.

Referring to FIG. 6, the user may execute a speech recognition application to input a search word. Thereafter, the user may input a voice search word together with a preset touch input.

In an embodiment, the user may touch the microphone icon and subsequently apply a drag input 610 downwards, during which the user may input "bank" by voice.

As a result, the recognized voice "bank" may be output to the search word output field. Further, a search result calculated based on the user's history information may be output to the time line.

In an embodiment, the following history information may be used.

When an appointment at 13 o'clock has been stored in schedule information, a route from the current location to an appointed place may be calculated. Alternatively, it may be calculated that there is an appointment at 13 o'clock from a text message, an SNS message, or the like.

Based on the history information, the time line is stretched out according to the drag input 610 of the user, and a current time, an icon 620 corresponding to a current location, and information 620-1 about a bank closest to the current location may be output. Here, when a touch input is applied to the information 620-1 regarding a bank closest to the current location, detailed information related thereto is further output.

Thereafter, when a drag input 630 is applied, the time line is subsequently stretched out and a specific time after the current time and an icon 640 corresponding to a location at the specific time may be output.

The specific time and the location at the specific time may be calculated as the following embodiment. In detail, a transportation means for moving from the current location to the appointed place may be detected. As the transportation means, a means frequently used by the user or a fastest means by which the user may get to the appointment place, and the like, may be detected.

Thereafter, a specific time and a location at the specific time may be calculated based on the detected transportation means, a route from the current location to the appointed place, and the like. For example, when the user moves from the current location to the appointed place by bus, the user may pass by a park in five minutes. Accordingly, a result of searching for a bank near the park may be output.

In another embodiment, when the appointed place is close from the current location, walking may be selected. In this case, a walking speed, and the like, may be calculated based on previously input body information (height, stride, etc.) of the user.

Accordingly, the specific time and the location at the specific time may be calculated based on the walking speed of the user, the route from the current location to the appointed place, and the like. For example, when the user moves from the current location to the appointed place on foot, the user may pass by a park in 15 minutes.

Accordingly, a result of searching for a bank near the park may be output.

In another embodiment, a plurality of pieces of bank information 640-1 and 640-2 searched to be within a range close to the location at the specific time may be output. Here, information 640-1 of the closer bank may be preferentially output.

In another embodiment, when the user applies a touch input to the preferentially output bank information 640-1, specific information related to the bank may be further output. For example, a route (map) from the location at the specific time to the bank, an arrival time, a distance, and the like, may be output.

In another embodiment, when the user is at a longer distance so the user applies a touch input to information 640-2 of a bank output with a lower priority, specific information related to the bank may be output. Similarly, a route (map) from the location at the specific time to the bank with a lower priority, an arrival time, a distance from the location at the specific time to the bank with a lower priority may be output.

Hereinafter, an embodiment in which a search result is calculated according to priority calculated based on history information will be further described.

Figure 7:
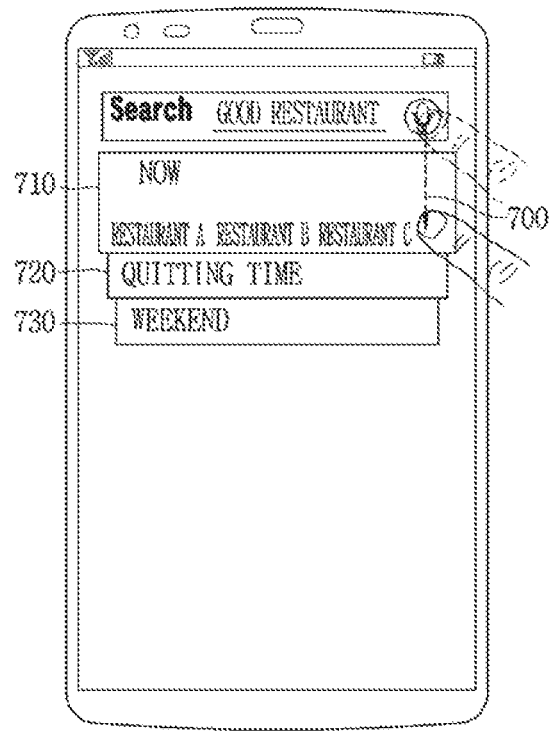
FIG. 7 is a conceptual diagram illustrating an embodiment in which a good restaurant is output based on history information.

FIG. 7 is a conceptual diagram illustrating an embodiment in which a good restaurant is output based on the history information.

Referring to FIG. 7, a user may execute a speech recognition application to input a search word. Thereafter, the user may input a voice search word together with a preset touch input.

In an embodiment, the user may touch the microphone icon and subsequently apply a drag input 700 downwards, during which the user may input "good restaurant" by voice.

As a result, the recognized voice "good restaurant" may be output in the search word output field. Also, pieces of good restaurant information 710, 720, and 730 calculated based on the user's history information may be output according to priority.

In an embodiment, the following history information may be used.

Depending on the usual location of the terminal 100 or a schedule of the user, the current time 12:00 may be detected as a company lunch time, and 6:00 p.m. may be detected as a quitting time. Also, it may be detected that there is an appointment on the weekend from the stored schedule information.

In another embodiment, it may be detected that there is an appointment on the weekend from a message exchanged with a person for the appointment, a record of searching for a weekend weather on a website, a record of searching for information regarding a good restaurant near an appointed place, and the like.

That is, the current time, the quitting time, and the weekend may be detected as a time zone in which the user's state (location of the terminal) is varied.

Based on the history information, it is extracted that the intention of the user who has input the "good restaurant" by voice is to search for the restaurant for lunch currently. As a result, the good restaurant information 710 near the company may be preferentially output.

In detail, the good restaurant information 710 which is near the company and has a highest priority may be output at the point to which the drag input is applied. Also, the good restaurant information 720, which is searched on the way to home after work and has next priority, may be output in a next layer.

Similarly, the information 730 regarding a good restaurant which is near the appointed place on the weekend and has a lowest priority may be output as a lowest layer. Here, only a time or place may be simply displayed in the lower layer.

Giving priority as described above is an embodiment and priority may be set in order closer to the current time. In another embodiment, when the user visits a good restaurant every weekend, a top priority may be given to weekends.

Thereafter, when the user releases the finger applying the drag input 700 from the screen 151, more specific information related to the good restaurant near the company may be output. For example, a good restaurant location, a rating, a representative menu, business hours, and the like may be output.

In another embodiment, only the good restaurant information 710 having highest priority may be output to the full screen 151.

Figure 8:
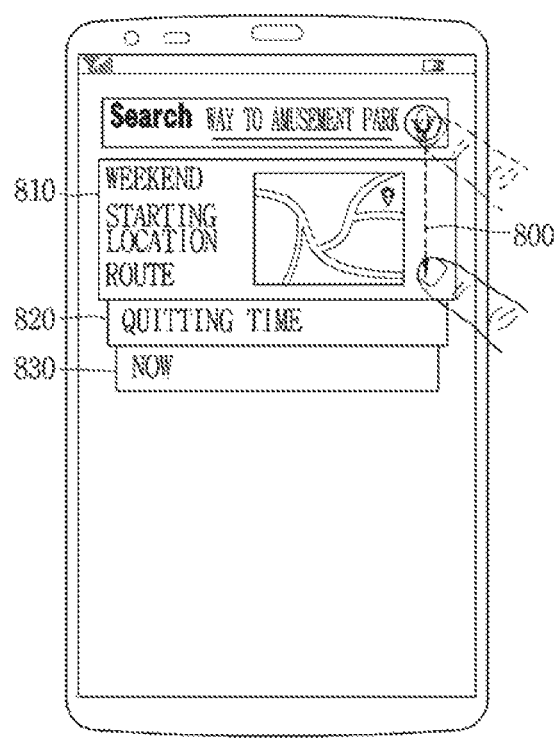
FIG. 8 is a conceptual diagram illustrating an embodiment in which a route to a destination is output based on history information.

FIG. 8 is a conceptual diagram illustrating an embodiment in which a route to a destination is output based on history information.

Referring to FIG. 8, a user may execute a speech recognition application to input a search word. Thereafter, a voice search word may be input together with a preset touch input.

In an embodiment, the user may touch the microphone icon and subsequently apply a dragging input 800 downwards, during which the user may input "way to amusement park" by voice.

As a result, the recognized voice, "way to the amusement park" may be output to the search word output field. Also, pieces of route information 810, 820, 830 calculated on the basis of the user's history information may be output according to priority.

In an embodiment, the following history information may be used.

Depending on the usual location of the terminal 100 or a schedule of the user, the current time may be detected as business hours and 6:00 p.m. may be detected as a quitting time. In addition, a schedule for going to the amusement park on the weekend may be detected from the stored schedule information.

In another embodiment, a schedule for going to the amusement park on the weekend may be detected from exchanged messages, a record of checking weather for the weekend from a website, a record of searching for amusement parks, and the like.

That is, the current time, the quitting time, and the weekend may be detected as a time zone in which the user's state (location of the terminal) is varied.

Based on such history information, it is extracted that the intention of the user who has input "way to the amusement park" is to search the amusement park to go on the weekend. As a result, an optimal route 810 from the house to the amusement park on the weekend may be preferentially output.

In detail, the optimal route 810 from the house to the amusement park on the weekend with highest priority may be output to the point where the drag input 800 is applied. In addition, the optimal route 820 from the company to the amusement park with next priority may be output in a next layer.

Similarly, the optimal route 830 from a current place which the user visits on business having lowest priority (assuming that it is currently business hours and the user is in the place which the user visits on business) to the amusement park may be output in a lowest layer. Here, only a time or place may be displayed briefly in the lower layer.

Subsequently, when the finger applying the drag input 800 is released from the screen 151, more specific information related to the optimal route from the house to the amusement park on the weekend may be output. For example, a weather on the weekend, events at the amusement park, fare information, and the like, may be output.

Also, in another embodiment, only the optimal route 810 from the house to the amusement park on the weekend with highest priority may be output to the full screen 151.

Meanwhile, after a user input for selecting a part of the at least one search result is applied, when a user input for inputting a search word again is applied, the controller 180 may calculate a search result corresponding to the re-input search word based on the selected search result.

Figure 9:
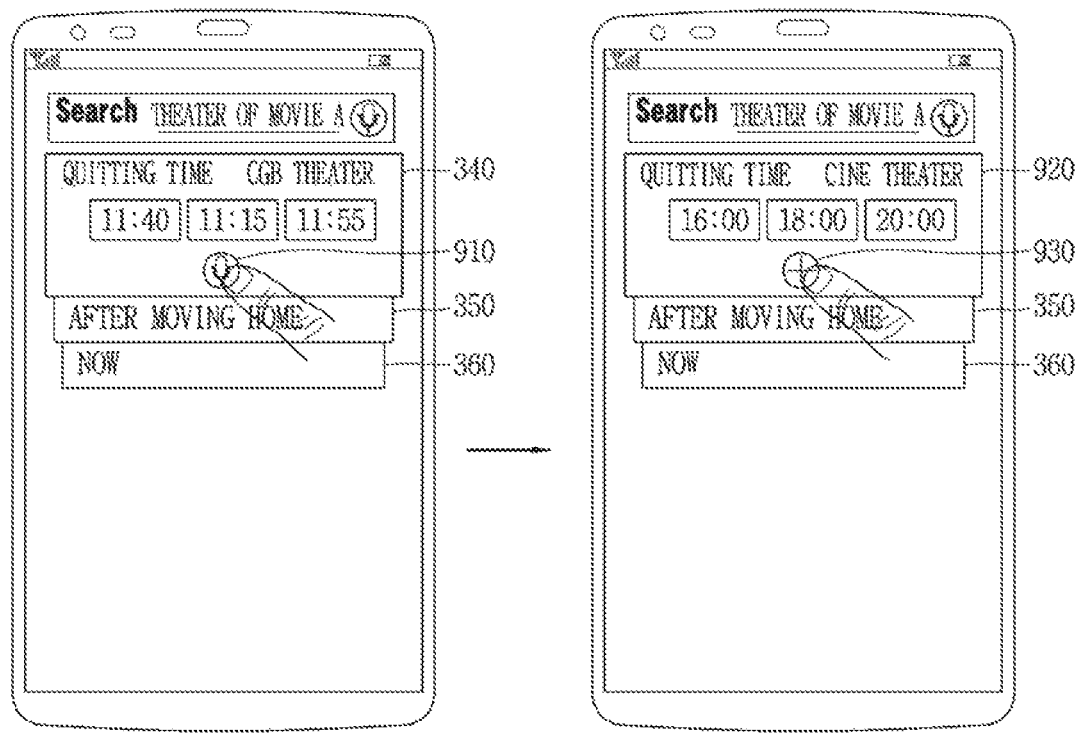
FIG. 9 is a conceptual diagram illustrating an embodiment in which a search word is input again after a search result is output.

FIG. 9 is a conceptual diagram illustrating an embodiment in which a search word is input again after a search result is output.

Referring to FIG. 9, the screening information 340, 350, and 360 of the movie theater of movie A may be output according to priority to a point where the drag input is applied, as described above with reference to FIG. 3. Subsequently, while applying a touch input to the microphone icon 910, the user may additionally input a voice search word "another movie theater".

Accordingly, another theater 920 of movie A near the company may be output. That is, another theater of movie A may be searched based on the information "movie theater of movie A near company at quitting time".

In another embodiment, it may be set such that the re-searched result 920 is output with priority over a previous search result by applying the additional icon 930.

Meanwhile, the controller 180 may calculate a plurality of search results corresponding to the input search word based on the history information related to the search word, and outputs a screen for selecting at least one of the plurality of calculated search results.

Thereafter, when a user input for selecting at least one of the plurality of calculated search results is applied, the controller may execute a control command corresponding to the selected search result.

Figure 10:
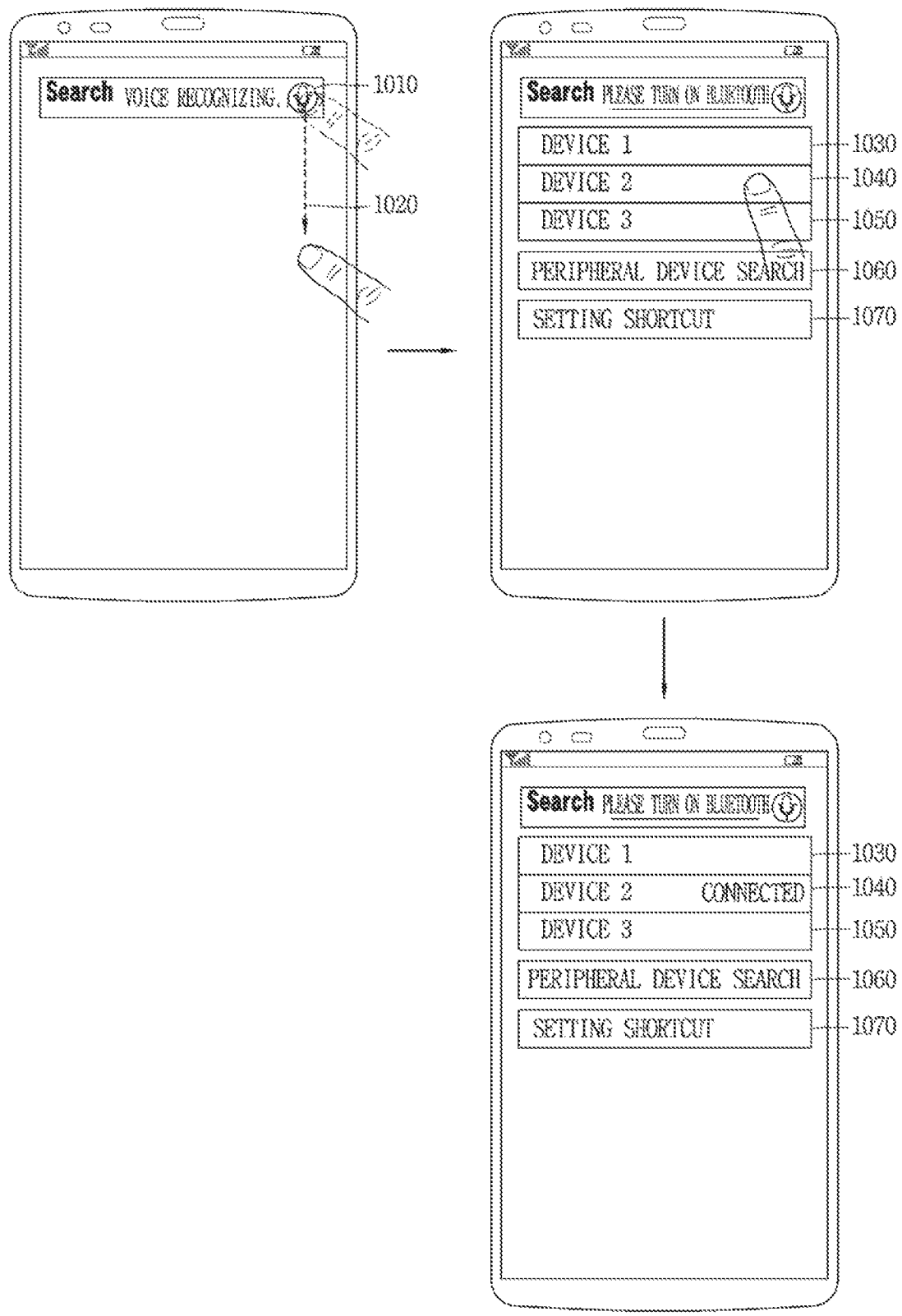
FIG. 10 is a conceptual diagram illustrating an embodiment in which a connectable device is selected.

Hereinafter, an embodiment for establishing a connection with an external terminal and an embodiment for setting alarm will be described as related embodiments. FIG. 10 is a conceptual diagram illustrating an embodiment for selecting a connectable device.

Referring to FIG. 10, the user may execute the speech recognition application to input a search word. Thereafter, the user may input a voice search word together with a preset touch input.

In an embodiment, the user may touch the microphone icon 1010 and subsequently apply a drag input 1020 downwards, during which the user may input "please turn on Bluetooth" by voice.

As a result, the recognized voice "Please turn on Bluetooth" may be output to the search word output field. In addition, a list of devices 1030, 1040, and 1050 calculated based on the user's history information may be output according to priority.

In an embodiment, the menu 1030 corresponding to a first device most frequently connected by Bluetooth may be output at the uppermost position. Subsequently, the menu 1040 corresponding to a second device occasionally connected by Bluetooth may be output. Also, the menu 1050 corresponding to a third device, which has not been connected by Bluetooth but is searched as a peripheral device, may be output subsequently.

In another embodiment, a menu 1060 for additionally searching for a peripheral device and a menu 1070 for directly setting a Bluetooth connection may be displayed at a lower end of the screen 151.

Thereafter, the user may touch the device desired to be connected by Bluetooth to select it. In an embodiment, when a touch input is applied to the menu 1040 corresponding to the second device, the terminal 100 may be connected to the second device via Bluetooth. Accordingly, a message indicating connection to the menu 1040 corresponding to the second device may be output.

Figure 11:
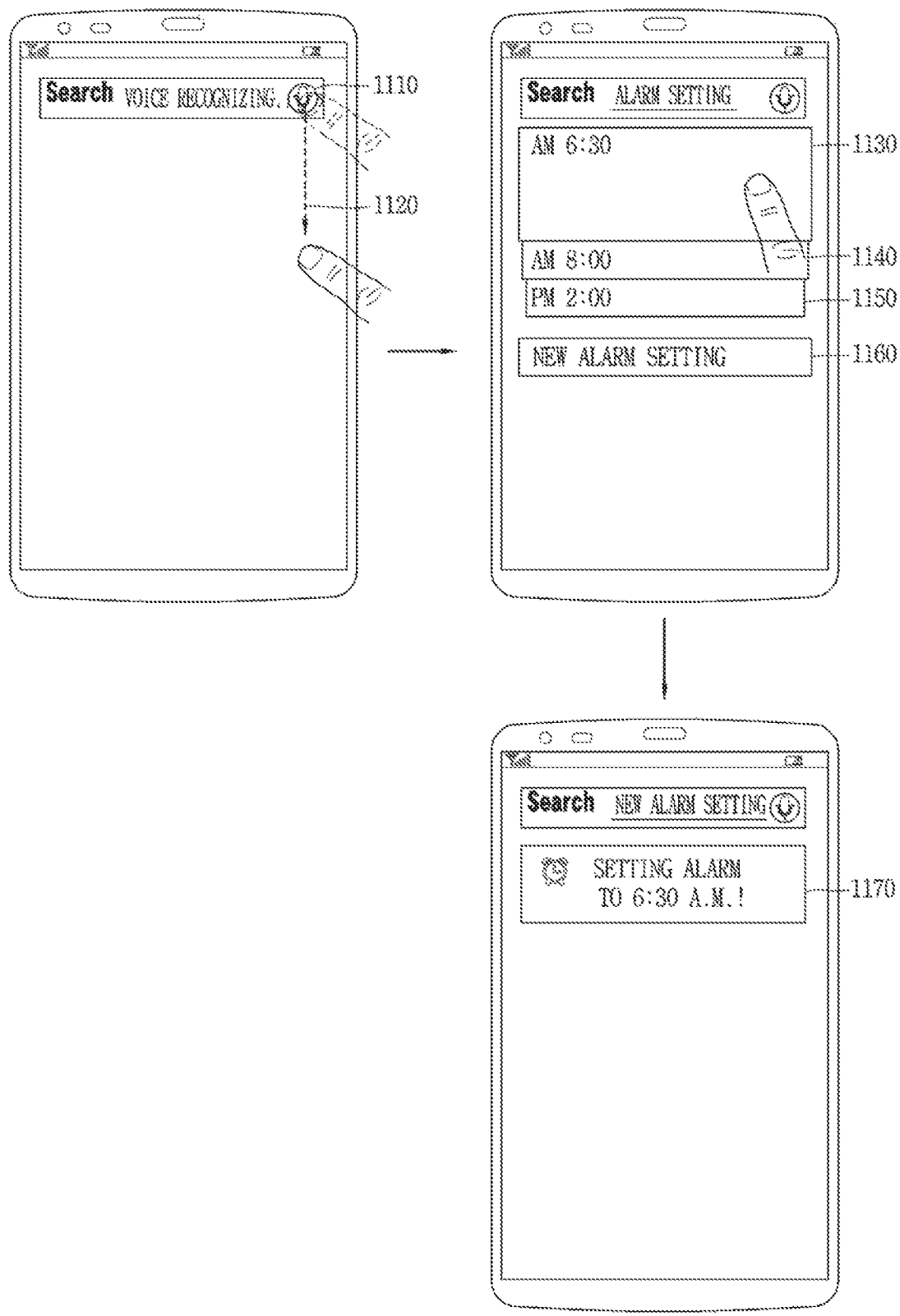
FIG. 11 is a conceptual diagram illustrating an embodiment in which an alarm is set.

FIG. 11 is a conceptual diagram illustrating an embodiment for setting alarm.

Referring to FIG. 11, the user may execute the speech recognition application to input a search word. Thereafter, the user may input a voice search word together with a preset touch input.

In an embodiment, the user may touch the microphone icon 1110 and subsequently apply a drag input 1120 downwards, during which the user may input "alarm setting" by voice.

As a result, the recognized voice "alarm setting" may be output to the search word output field. Also, the alarm times 1130, 1140, and 1150 calculated based on the user's history information may be output according to priority.

In an embodiment, the menu 1130 corresponding to a time at which the alarm is set most frequently may be output at the uppermost position. Subsequently, the menu 1140 corresponding to a time at which the alarm is set occasionally may be output subsequently. Also, a menu 1150 corresponding to a meeting time stored in a schedule application may be output subsequently.

In another embodiment, a menu 1160 for setting a new alarm time may be output at a lower end of the screen 151.

Thereafter, when the finger touching the menu 1130 corresponding to the time at which the alarm is set most frequently is released, alarm may be set at the time. Accordingly, a message window 1170 indicating that alarm is set at the time may be output. Here, the set alarm contents may be output by voice.

Figure 12:
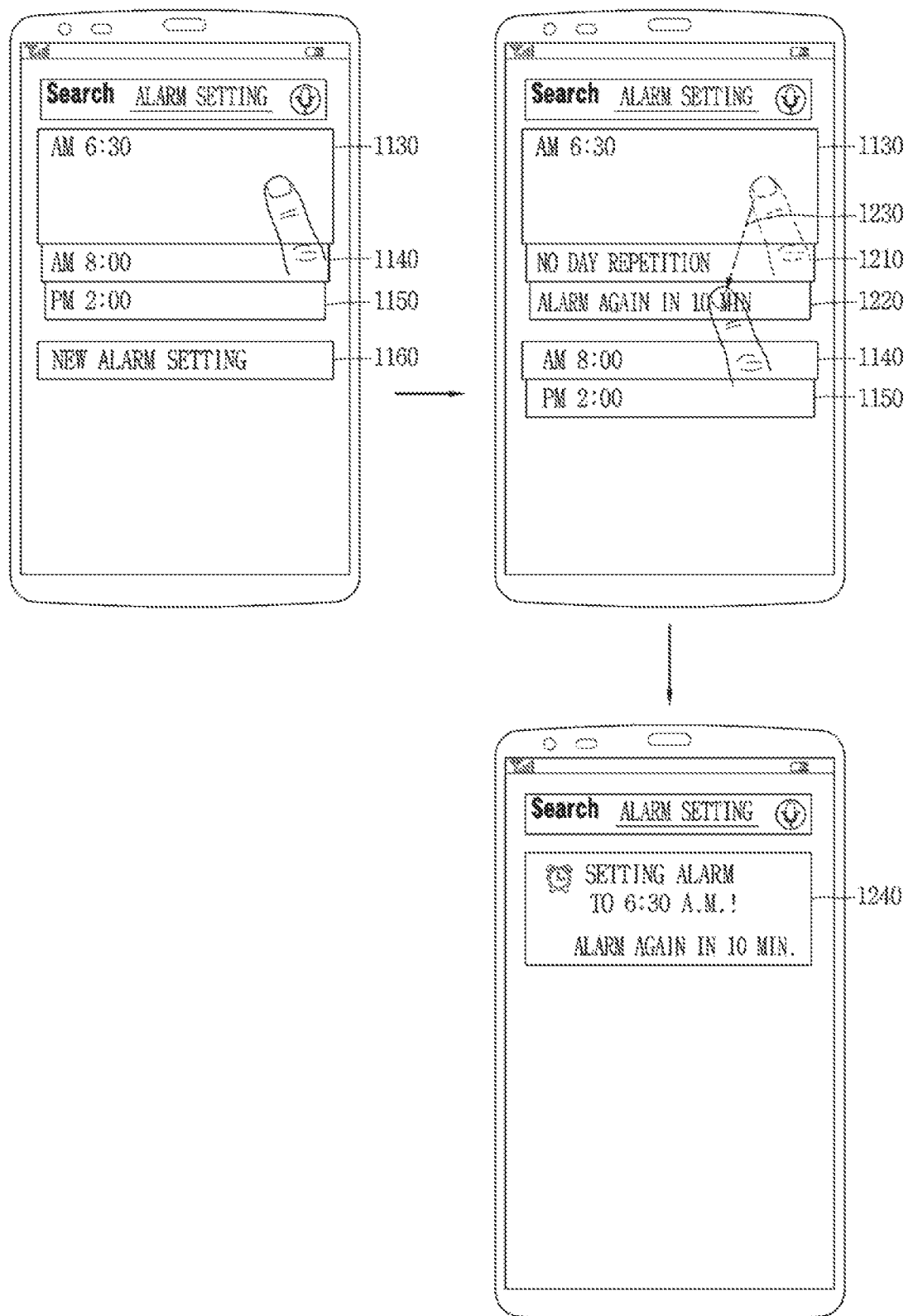
FIG. 12 is a conceptual diagram illustrating an embodiment in which an additional matter of alarm setting is selected.

FIG. 12 is a conceptual diagram illustrating an embodiment for selecting additional matters of alarm setting.

Referring to FIG. 12, a menu 1130 corresponding to the time at which alarm is set most frequently, the menu 1140 corresponding to the time at which alarm was set occasionally, the menu 1150 corresponding to the meeting time stored in the schedule application described above with reference to FIG. 11 may be output.

Here, in case where the user maintains the touch input applied to the menu 1130 corresponding to the time at which alarm is set most frequently for a predetermined time, menus 1210 and 1220 for setting specific contents may be output.

In an embodiment, the menu 1210 for setting a day of the week on which alarm is repeated and the menu 1220 for setting a time for sounding alarm again until alarm is checked may be output.

Thereafter, when a drag input 1230 is applied to the menu 1220 for setting a time for sounding alarm again until alarm is checked, alarm may be set to 6:30 a.m. and alarm may be set to sound at intervals of 10 minutes until alarm is checked. Or, this may be selected by touching the menu 1220 for setting a time at which alarm sounds.

As a result, a message window 1240 indicating that alarm is set to 6:30 a.m. and alarm sounds again at intervals of 10 minutes until alarm is checked may be output. Here, the set alarm contents may be output by voice.

Figure 13:
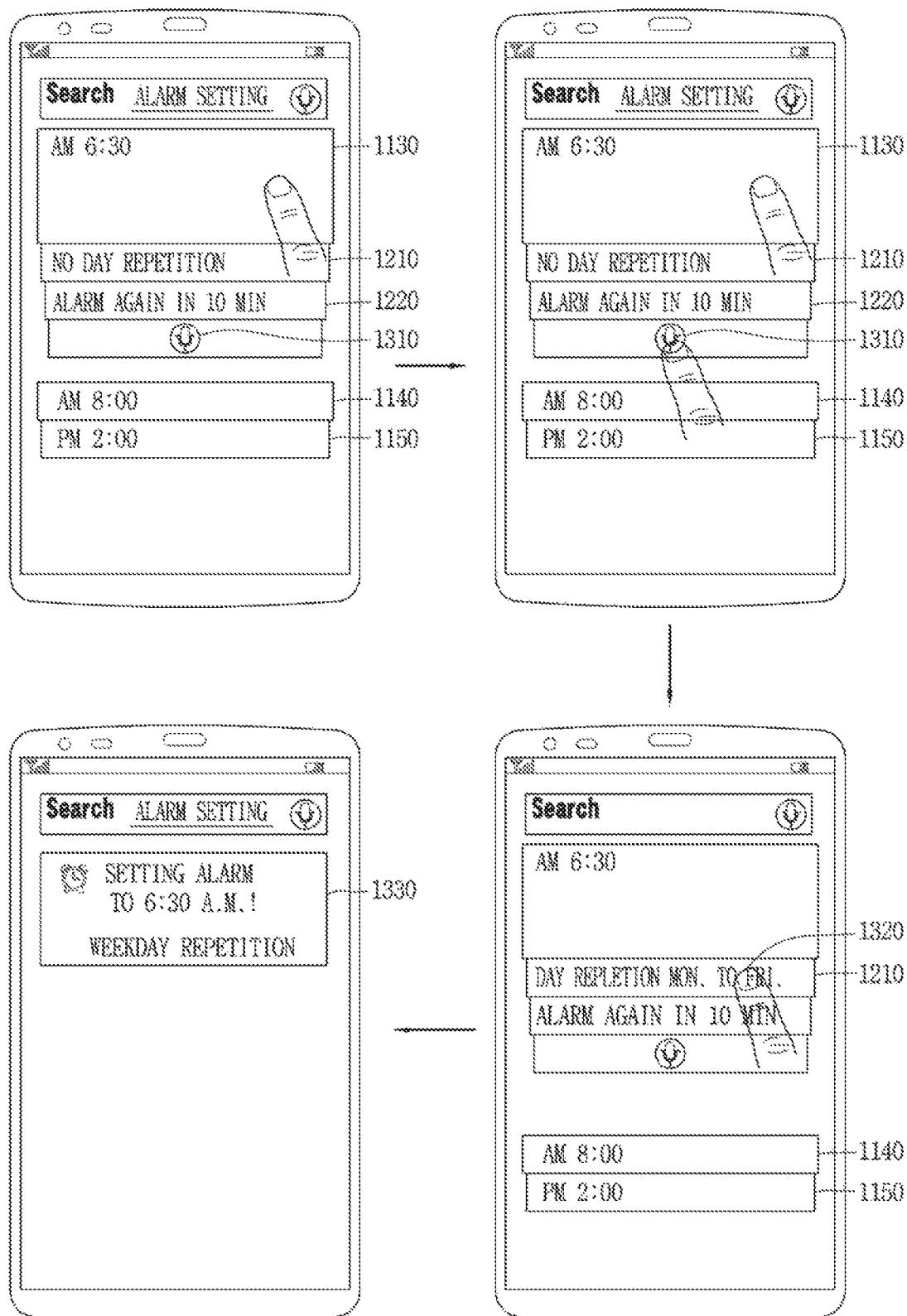
FIG. 13 is a conceptual diagram illustrating an embodiment in which an additional matter of alarm setting is input by voice.

FIG. 13 is a conceptual diagram illustrating an embodiment in which additional matters of alarm setting are input by voice.

Referring to FIG. 13, the menu 1130 corresponding to the time at which alarm is set most frequently, the menu 1140 corresponding to the time at which alarm was set occasionally, the menu 1150 corresponding to the meeting time stored in the schedule application described above with reference to FIG. 11 may be output.

Here, when the user maintains the touch input applied to the menu 1130 corresponding to the time at which the alarm is set most frequently for a predetermined time, menus 1210 and 1220 for setting the specific contents may be output.

In an embodiment, the menu 1210 for setting a day of the week on which alarm is repeated and the menu 1220 for setting a time for sounding alarm until alarm is checked may be output.

Further, a microphone icon 1310 for additionally inputting a voice may be output. The user may input "weekday repetition" by voice, while touching the microphone icon 1310.

Accordingly, it is displayed that alarm is set from Monday to Friday in a day repetition menu 1210. Also, as the touch input 1320 is applied to the menu 1210, alarm may be set to sound at 6:30 a.m. from Monday to Friday. Here, a message window 1330 indicating the contents of the alarm setting may be output.

Effects of the mobile terminal and the control method thereof according to the present invention are as follows.

According to at least one of the embodiments of the present invention, an intention of the user who inputs a search word may be extracted based on history information related to a search word, e.g., a current location of the terminal or a usual location of the terminal, a schedule of the user stored in a schedule application, a received message or call, an SNS message, an e-mail, a record of goods purchase, a record of searching a website, a search word input in a website, memo record contents, a user state, a usage pattern, and the like.

Accordingly, it is possible to provide a user context-based IA recommendation in consideration of information of a future state of the user, as well as a current state of the user.

In addition, according to at least one of the embodiments of the present invention, convenient searching may be provided through a multimodal interface using a combination of voice and touch.

According to another embodiment of the present invention, information may be easily and intuitively provided by expressing a search result in a time line and a space line.

According to another embodiment of the present invention, since a plurality of search results are recommended, user inconvenience of the related art in which only one search result is output, so if the search result is wrong, a search word must be input again may be solved.

According to another embodiment of the present invention, it is possible to perform searching step-by-step based on a search result calculated by inputting an additional search word.

As a result, user convenience may be improved.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The invention claimed is:

1. A mobile terminal comprising:
   display;
   a user input unit configured to:
      receive a search word from a user; and
      receive a user input while the received search word is displayed on the display, wherein the user input comprises a drag input applied by the user while the search word is displayed on the display; and
   a controller configured to:
      generate a timeline up to a specific future time point based on a current time point according to a length of the drag input;
      derive a user state at any future point in time determined in response to the user input based on the user's history information including a preset schedule while the search word is displayed on the display, wherein a different user state is derived for each different time point from the current time point to the specific future time point; and
      cause the display to display at least one search result associated with the search word based on the derived user state such that a different search result is displayed for the same search word based on the derived different user state respectively corresponding to a different time point.

2. The mobile terminal of claim 1, wherein the user input unit receives the search word from the user by voice.

3. The mobile terminal of claim 1, wherein:
   the derived user state comprises a location of the user predicted for the specific future point in time; and
   the controller is further configured to cause the display to display information on at least one place corresponding to the search word as the at least one search result based on the predicted location of the user.

4. The mobile terminal of claim 1, wherein the controller is further configured to:
   set priority of the at least one search result; and
   cause the display to display the at least one search result according to the set priority.

5. The mobile terminal of claim 1, wherein after a user input for selecting one of the at least one search result is applied, when a user input for inputting a new search word is applied, the controller is further configured to calculate a search result corresponding to the new search word based on the selected search result.

6. The mobile terminal of claim 1, wherein:
   the at least one search result comprises a plurality of search results; and
   the controller is further configured to cause the display to display detailed information related to any one of the plurality of search results according to a user's selection.

7. The mobile terminal of claim 6, wherein when a user selects any one of the plurality of search results, the controller executes a control command corresponding to the selected search result.

8. A method for controlling a mobile terminal, the method comprising:
(a) receiving a search word from a user and receiving a user input while the received search word is displayed on a display, wherein the user input comprises a drag input applied by the user while the search word is displayed on the display;
(b) deriving a user state at any future point in time determined in response to the user input based on the user's history information including preset schedule while the search word is displayed on the display, wherein (b) includes:
generating a timeline up to a specific future time point based on a current time point according to a length of the drag input; and
deriving a different user state for each different time point from the current time point to the specific future time point; and
(c) displaying at least one search result associated with the search word based on the derived user state such that a different search result is displayed for the same search word based on the derived different user state respectively corresponding to a different time point.

9. The method of claim 8, wherein (a) includes:
receiving the search word from the user by voice.

10. The mobile terminal of claim 8, wherein:
the derived user state comprises a location of the user predicted for the specific future point in time; and
(c) includes: displaying information on at least one place corresponding to the search word as the at least one search result based on the predicted location of the user.

11. The mobile terminal of claim 8, wherein (c) includes: setting priority of the at least one search result, and outputting the at least one search result according to the set priority.

12. The mobile terminal of claim 8, wherein (c) includes: after a user input for selecting one of the at least one search result is applied, when a user input for inputting a new search word is applied, calculating a search result corresponding to the new search word based on the selected search result.

13. The mobile terminal of claim 8, wherein (c) includes: when the at least one search result comprises a plurality of search results, displaying detailed information related to any one of the plurality of search results according to a user's selection.

14. The mobile terminal of claim 13, wherein (c) includes: when a user selects any one of the plurality of search results, executing a control command corresponding to the selected search result.

* * * * *